United States Patent

Heilig

[11] Patent Number: 5,913,634
[45] Date of Patent: *Jun. 22, 1999

[54] ATTACHMENT DEVICE FOR CONNECTING A VEHICLE STEERING WHEEL TO A STEERING SHAFT

[75] Inventor: Alexander Heilig, Wissgoldingen, Germany

[73] Assignee: TRW Occupant Restraint Systems GmbH, Alfdorf, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/726,199

[22] Filed: Oct. 4, 1996

[30] Foreign Application Priority Data

Oct. 20, 1995 [DE] Germany ............................ 295 16 622

[51] Int. Cl.$^6$ ....................................................... F16B 2/18
[52] U.S. Cl. .................................. 403/374.1; 403/409.1; 403/DIG. 8; 74/552
[58] Field of Search ...................................... 403/373, 374, 403/379, 378, 324, 359, 290, 322, DIG. 8, 344, 362, 321, 257, 374.1, 409.1; 74/552; 285/312, 309

[56] References Cited

U.S. PATENT DOCUMENTS

| | | | |
|---|---|---|---|
| 1,475,257 | 11/1923 | Bottone | 403/321 |
| 1,648,886 | 11/1927 | Allen | 403/324 X |
| 2,639,160 | 5/1953 | Studebaker et al. | 403/374 X |
| 2,885,231 | 5/1959 | Smity | 403/359 X |
| 2,948,559 | 8/1960 | Recker | 403/359 X |
| 3,179,450 | 4/1965 | Recker | 403/359 X |
| 3,383,123 | 5/1968 | Murray | 285/312 X |
| 3,613,476 | 10/1971 | Cunningham | 74/552 X |
| 3,796,464 | 3/1974 | Hansen et al. | 403/378 X |
| 3,841,672 | 10/1974 | Schultz et al. | 403/379 X |
| 3,923,409 | 12/1975 | Stoner | 403/373 X |
| 4,433,496 | 2/1984 | Jones et al. | 403/374 X |
| 4,809,995 | 3/1989 | Ramunas | 403/374 X |
| 5,253,949 | 10/1993 | Oxley et al. | 403/378 X |
| 5,318,375 | 6/1994 | Entrup et al. | 403/359 |
| 5,433,163 | 7/1995 | McKiernan | 285/312 X |
| 5,588,337 | 12/1996 | Milton | 403/374.1 X |
| 5,647,686 | 7/1997 | Hancock et al. | 403/373 |

FOREIGN PATENT DOCUMENTS

| | | | |
|---|---|---|---|
| 0501149 | 9/1992 | European Pat. Off. | |
| 1015704 | 9/1957 | Germany . | |
| 655837 | 8/1951 | United Kingdom | 74/552 |

*Primary Examiner*—Harry C. Kim
*Attorney, Agent, or Firm*—Tarolli, Sundheim, Covell, Tummino & Szabo

[57] ABSTRACT

The invention relates to an attachment device for connecting a steering wheel to a steering shaft. The steering wheel comprises a hub and the steering shaft comprises an end to be associated with the hub and provided with a circumferential groove. The attachment device comprises a locking element which is rotatably mounted on the hub. The locking element is movable between a locking position, in which it engages in the circumferential groove and forms an interlocking connection between the hub and the steering shaft, this interlocking connection being effective in the direction of a longitudinal axis of the steering shaft, and a release position where the end assigned to the hub can be withdrawn from the latter.

3 Claims, 1 Drawing Sheet

ATTACHMENT DEVICE FOR CONNECTING A VEHICLE STEERING WHEEL TO A STEERING SHAFT

The invention relates to an attachment device for connecting a steering wheel to a steering shaft.

BACKGROUND OF THE INVENTION

Normally, the following demands are made on such an attachment device: the attachment must connect the steering wheel to the steering shaft in a positive and secure way, since accidental loosening of this connection could have grave consequences. Furthermore, the connection must be detachable, so that, for example, the steering wheel can be replaced. Finally, it must also be possible to adjust the angular alignment of the steering wheel in relation to the steering shaft.

With the usual method of attaching the steering wheel to the steering shaft, a spline shaft connection is used to produce the joint-rotation shaft/hub connection. By fitting the hub with internal splines onto the end of the steering shaft provided with external splines, a joint-rotation connection is achieved between steering wheel and steering shaft, the angular alignment of which can be adjusted. In order to secure the hub on the steering shaft in the axial direction of the latter, a nut is screwed onto a thread extension formed on the named end of the steering s haft from the inside of the hub, this nut clamping the hub to the steering shaft. This attaches the steering wheel to the shaft in a positive and secure manner.

As a consequence of the growing safety awareness in recent time, gas bag restraint systems are being increasingly used, which are located on the driver's side inside the hub of the steering wheel. In the interests of efficient assembly, such a gas bag restraint system should already be fitted in the steering wheel when supplied to the vehicle manufacturer. However, the consequence of this is that, as a result of the components of the gas bag restraint system mounted inside the hub of the steering wheel, access to a clamping element located inside the hub is difficult or even impossible.

SUMMARY OF THE INVENTION

The invention relates to an attachment device for connecting a steering wheel to a steering shaft and provides an attachment whereby the steering wheel can be connected to the steering shaft from outside the hub. The steering wheel comprises a hub, and the steering shaft comprises an end to be associated with the hub and provided with a circumferential groove. The attachment comprises a locking element which is rotatably mounted on the hub. The locking element is movable between a locking position, in which it engages in the circumferential groove and forms an interlocking connection between the hub and the steering shaft, this interlocking connection being effective in the direction of a longitudinal axis of the steering shaft, and a release position where the end assigned to the hub can be withdrawn from the latter. By using a locking element which engages on the outside of the steering shaft, namely in the circumferential groove, the conditions for actuating this locking element from outside the hub are created, which is not possible using the locking elements screwed onto the end of the steering shaft. Furthermore, it is also possible to displace the locking element between the locking position and the release position by means of a simple rotational movement.

BRIEF DESCRIPTION OF THE DRAWING

The invention is explained below with reference to the enclosed drawing. Here.

DETAILED DESCRIPTION OF THE INVENTION

Figure 1:
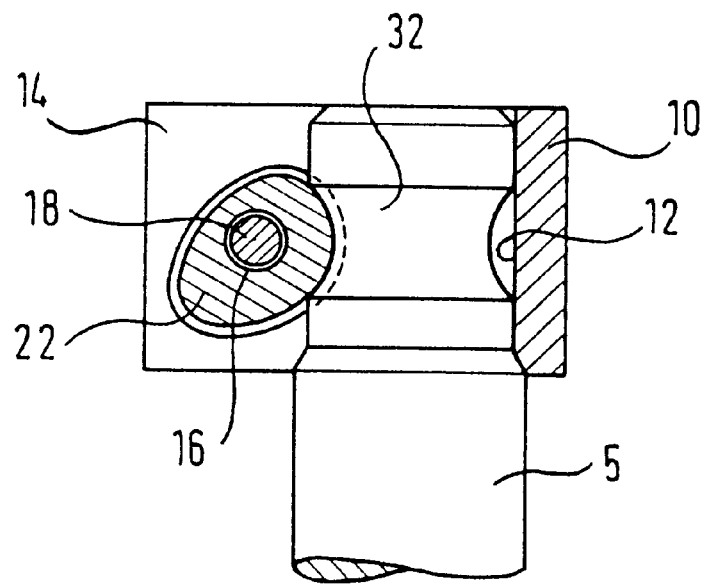
FIG. 1 schematically depicts in a partial side view a preferred embodiment of an attachment for connecting a steering wheel to a steering shaft, as provided by the invention.
Figure 2:
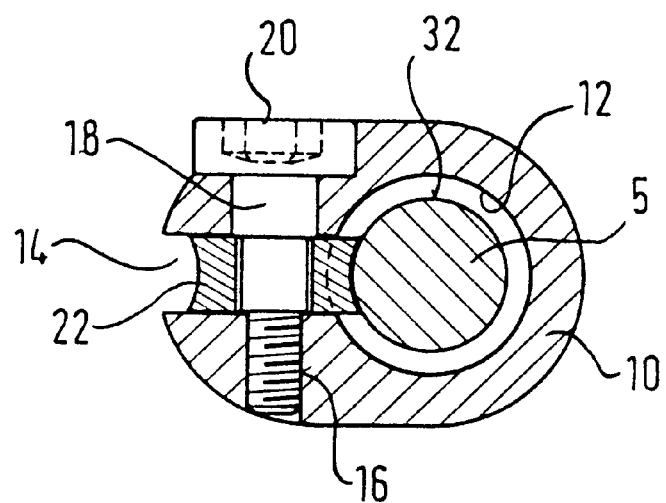
FIG. 2 schematically depicts a cross-section of the attachment of FIG. 1.

FIGS. 1 and 2 schematically depict a preferred embodiment of an attachment according to the invention for connecting a steering wheel (not illustrated) to a steering shaft 5. The steering wheel has on its hub (not illustrated) an extension 10 shown in section. The inside of the hub and, hence, the side of the steering wheel facing the driver, is located above the extension 10 shown in FIG. 1. In the extension 10, an essentially cylindrical opening 12 is formed which has a slot 14 on one side. A hole 16 passes through the wall of the extension 10 in such a way that it crosses the slot 14. The longitudinal axis of the hole 16 is perpendicular to the longitudinal axis of the opening 12. The hole 16 rotatably accommodates a bolt 18 such that its head 20 is located outside the extension 10. On the section of the shank of the bolt 18 which passes through the slot, a cam 22 is attached for joint-rotation, said cam being eccentric in relation to the longitudinal axis of the bolt 18. In this way the cam is rotatable around the longitudinal axis of the bolt 18 and, as a result of the action on the head 20 of the bolt 18, can be moved into a first position, which is called the release position and in which the cam does not project into the inside of the extension 10, and into a second position which is called the locking position and in which the cam 22 projects into the inside of the extension 10. The end of the steering shaft 5 assigned to the steering wheel and having an external diameter corresponding to the internal diameter of the extension 10, is provided with a circumferential groove 32.

The steering wheel is connected to the steering shaft 5 by placing the steering wheel on the end of the steering shaft associated with it, whilst the cam 22 is in the release position. Once the circumferential groove 32 is located within the extension 10, the cam 22 is turned until it engages in the circumferential groove. By selecting suitable dimensions for the circumferential groove 32 and the cam 22 and by locating the cam 22 in an appropriate way relatively to the circumferential groove 32, it is possible to obtain self-locking of the cam 22 in the locking position. In order to release the cam 22, the latter is moved into the release position using the bolt 18, and the steering wheel can be removed unhindered from the steering shaft 5. The head of the bolt 18 is easily accessible from outside the hub.

Merely by engaging the cam on the steering shaft 5, it is possible to achieve a frictional shaft/hub connection, which is adequate for the loads that occur. However, according to a further development of the invention (not illustrated), external splines can be formed on the steering shaft and internal splines on the extension, if this is desired, thus also providing a positive locking connection between steering wheel and steering shaft.

By using a sleeve nut fitted outside the hub for attaching the vehicle steering wheel to the steering shaft, it is not necessary for the inside of the hub to be accessible. This, therefore, makes it possible to mount the appropriate components of a gas bag restraint system into the inside of the hub of the steering wheel before the steering wheel is connected to the steering shaft. According to a further development (not illustrated), the steering shaft may be hollow so that a gas generator can be positioned in the steering shaft, and this gas generator is then connected by the inside of the steering shaft to the inside of the hub, in which the appropriate components of a gas bag restraint system are housed.

I claim:

1. An apparatus comprising:

a steering shaft of a vehicle, said steering shaft having a longitudinal axis and a circumferential groove extending around said longitudinal axis;

a hub of a steering wheel extending around said circumferential groove of said steering shaft; and a locking element rotatably mounted on said hub and rotatable between a locking position in which said locking element is located in said circumferential groove and in engagement with said steering shaft to form an interlocking connection between said hub and said steering shaft blocking relative movement of said steering shaft and said hub along said longitudinal axis and a release position in which said hub can be withdrawn from said steering shaft, said locking element being rotatably mounted on said hub by means of a bolt, said bolt having a longitudinal axis and being connected to said locking element for joint rotation, said locking element being formed as a cam eccentric in relation to said longitudinal axis of said bolt, said cam being so dimensioned with respect to said circumferential groove that said cam is self-locked in said locking position.

2. An apparatus according to claim 1, wherein said locking element is mounted for rotation about an axis which is perpendicular to said longitudinal axis of said steering shaft.

3. An apparatus according to claim 1 wherein said steering shaft includes a bevel seat having a cone and said hub includes a bevel accommodation.

* * * * *